Oct. 7, 1941.    P. HARTMANN-RIIS    2,258,385
TEMPERATURE CONTROL IN OIL FIRED CENTRAL HEAT PLANTS
Filed May 29, 1937    2 Sheets-Sheet 1

P. Hartmann-Riis
INVENTOR

By Glascock Downing & Seebold

Oct. 7, 1941.   P. HARTMANN-RIIS   2,258,385
TEMPERATURE CONTROL IN OIL FIRED CENTRAL HEAT PLANTS
Filed May 29, 1937   2 Sheets-Sheet 2

P. Hartmann-Riis
INVENTOR

By: Glascock Downing & Seebold
ATTYS

Patented Oct. 7, 1941

2,258,385

UNITED STATES PATENT OFFICE 2,258,385

TEMPERATURE CONTROL IN OIL FIRED CENTRAL HEAT PLANTS

Petter Hartmann-Riis, Ostre Aker, near Oslo, Norway

Application May 29, 1937, Serial No. 145,618
In Norway March 4, 1936

10 Claims. (Cl. 236—91)

The present invention relates to temperature control of oil fired central heat plants.

It is known to employ electrical means to control the temperature of the water in the boiler of an oil fired central heat plant in such way that the temperature does not rise above a predetermined value.

The applicant has in his prior application No. 125,870 filed February 15, 1937 (Patent No. 2,171,099), described apparatus for controlling the size of the flame in plants of this kind in a predetermined relation to the water temperature in the boiler, in order to avoid frequent extinctions and ignitions of the flame and the waste of heat resulting therefrom.

It has also been suggested to automatically regulate the boiler temperature in relation to the outside temperature. Thus the use of a compound thermostat has been proposed, which is simultaneously controlled by the pressure of a medium in a bulb arranged outside the building and a bulb in the boiler. However, such apparatus is not considered dependable in use.

Apparatus is also known having a special set of thermostats for each outside temperature and the desired corresponding water temperature. Such apparatus, however, is complicated and expensive.

The object of the present invention is to provide an automatic electrical system for controlling the temperature of the boiler in a predetermined relation to the existing outside temperature. The invention also includes the control of the size of the flame in relation to the outside temperature and the simultaneous use of these two control means, in order to obtain smooth operation of the system with the best possible heat economy.

According to the invention a switch is arranged in the circuit of the motor, which drives the oil pump and the air blower of the oil burner. The switch opens the circuit at a definite boiler temperature, which is predetermined in relation to an existing outside temperature, whereby the motor stops and the flame is extinguished. This disconnection of the motor may be effected by the closure of another circuit through a contact piece actuated by a temperature sensitive instrument, arranged in the open air and another contact piece, the position of which is determined by the boiler temperature. By the closure of this circuit a relay may be actuated to disconnect the motor.

A further object of the invention is the provision of means for the automatic control of the size of the flame in relation to the out-door temperature. It is evident that a low out-door temperature calls for a larger flame than a higher temperature. In the last case the flame will be frequently extinguished and ignited unless the size of the flame be not adequately controlled.

According to the invention this may be accomplished by imparting to the motor, which drives the oil pump and air blower of oil burner, a definite number of revolutions in relation to the out-door temperature, whereby the size of the flame will be controlled.

This may be effected by placing resistances of definite sizes in relation to the out-door temperatures in the motor circuit. When the out-door temperature is low, no resistance is included in the circuit, and the flame is complete. These resistances are inserted in circuit by a movable contact, the position of which is determined by a temperature sensitive instrument outside the building.

By the application of these two control systems simultaneously, both the temperature of the boiler and the size of flame will be controlled automatically in relation to the outside temperature.

In case the flame is extinguished its rekindling cannot be effected in the usual automatic way, unless the resistance is excluded from the motor circuit and for this reason a temperature responsive switch is placed in the flue and connected in parallel with the resistances. This thermostat operated switch is closed when the flue is cold and open when the flue is hot.

Other features of the invention will be apparent from the following description and the accompanying drawings.

In the drawings different embodiments of the invention are diagrammatically illustrated.

Figure 1:
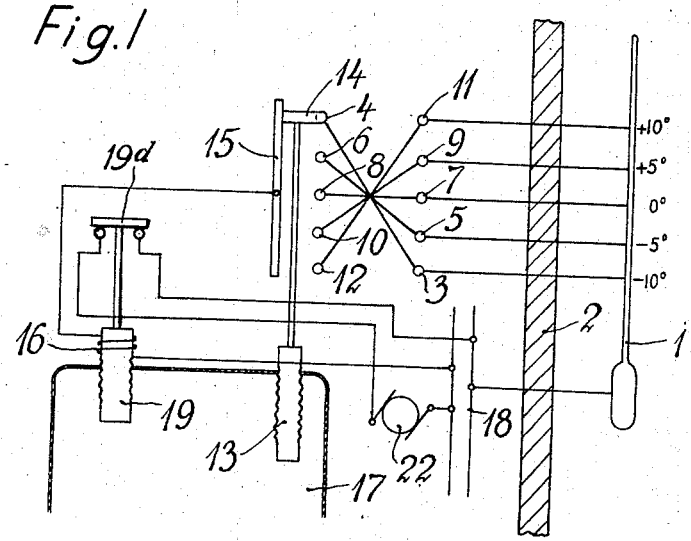
Fig. 1 shows a system, in which the temperature of the boiler is regulated in accordance with the outside temperature.

In Fig. 1 I is the temperature instrument which is sensitive to the outside temperature, in this case a mercury thermometer having contacts at −10° C., −5° C., 0° C., +5° C. and +10° C. From these contacts lines pass through the wall 2 of the building to contacts 3, 5, 7, 9 and 11, which are crosswise connected to the contacts 4, 6, 8, 10, 12, whereby the contacts 3 and 4, 5 and 6, 7 and 8, 9 and 10 and 11 and 12 are connected. A device 13, controlled by the boiler temperature, has a contact-piece 14, which at definite temperatures, for example at 40° C., 45° C., 50° C., 55° C. and 60° C. respectively connects the contacts 12, 10, 8, 6 and 4 with the contact bar 15. In case the outside temperature is below −10° C., no current will pass through the winding 16 and the temperature in the boiler 17 may increase to 65° C. for example, before the switch 19d operated by the thermostat 19 opens the motor circuit in the known manner. When the outside temperature is −10° C. the contact-piece 14 will connect the contact 4 with the bar 15, the heater circuit is closed, heat is produced by the winding 16, and the thermostat operates before the boiler temperature has reached the adjusted temperature of 65° C. In the same way, the boiler temperature will be adjusted in desired relation to the different outside temperatures.

Figure 2:
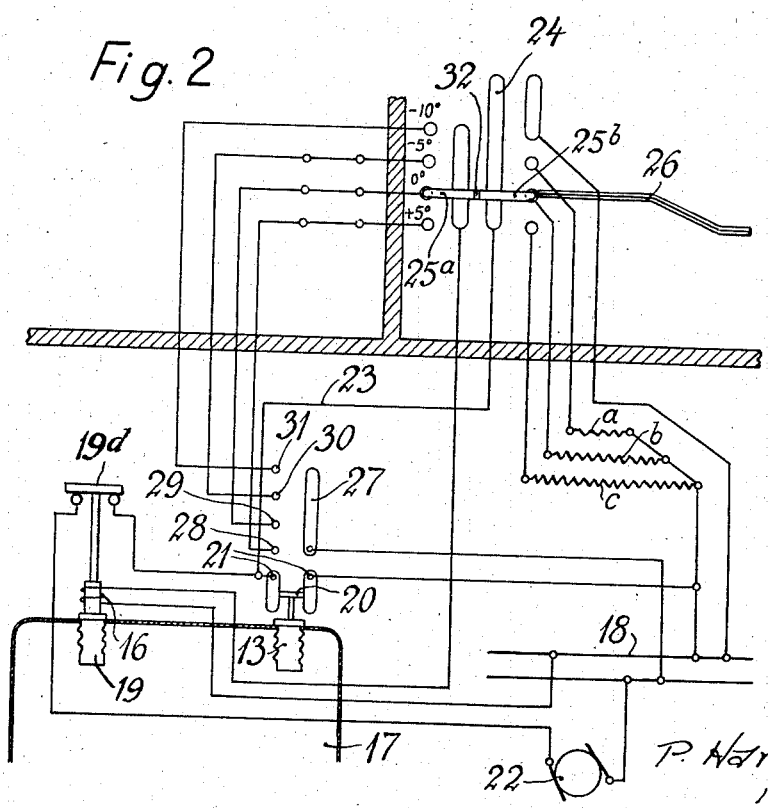
Fig. 2 shows a system in which both the boiler temperature and the size of the flame are regulated in accordance with the outside temperature and Fig. 3 shows a system similar to Fig. 2.

In the system shown in Fig. 2, 17 is the boiler provided with the temperature regulated device 19, which is adapted to receive additional heat from the winding 16 in the manner described above or is otherwise influenced in relation to the outside temperature.

The boiler also has another temperature sensitive device 13, which is similar to that shown in Fig. 1 and operates a contact-piece 20 for the regulation of the number of revolutions of the motor 22. The combined system operates as follows:

When the plant is put into operation the plant operates with complete flame, as the motor 22 receives complete voltage from the supply mains 18 through the thermostat operated switch 19d and the contact-piece 20. With increasing boiler temperature, the contact-piece 20 moves upwards along the contact-bars 21, until the temperature has increased so much that the contact-piece 20 no longer bridges the bars 21 and the motor current therefor, instead of flowing through the contact-piece 20 flows through the line 23 to the contact-bar 24, the contact-piece 25b, the position of which is determined by the thermostat 26, regulated by the outside temperature and through the resistance b back to the other side of the line 18.

As shown the outside temperature is 0° C. and the resistance b is connected in the motor circuit, but the greater resistance c will be inserted in the motor circuit at +5° C., and consequently the size of the flame will be further reduced, and at −10° C. and lower the size of the flame will be complete.

At increasing boiler temperatures the contact-piece 20 will reach the contact bar 27 and progressively connect the bar 27 with contacts 28, 29, 30, 31 which are arranged in positions corresponding to the boiler temperatures 45° C., 50° C. and 55° C. and 60° C. respectively. When as in the present case, the outside temperature is 0° the contact-piece 20 serves to close the circuit of the winding 16.

Thereby additional heat will be generated in the thermostat 19 when the contact-piece 20 reaches the contact 29, which in this case corresponds to the boiler temperature 50°. The circuit will be established through the outside temperature adjusted contact-piece 25a, which is insulated from the contact-piece 25b by the insulating piece 32. Thereby the maximum boiler temperature will be restricted to 50° C., which in the present case is considered as convenient in the plant.

Figure 3:
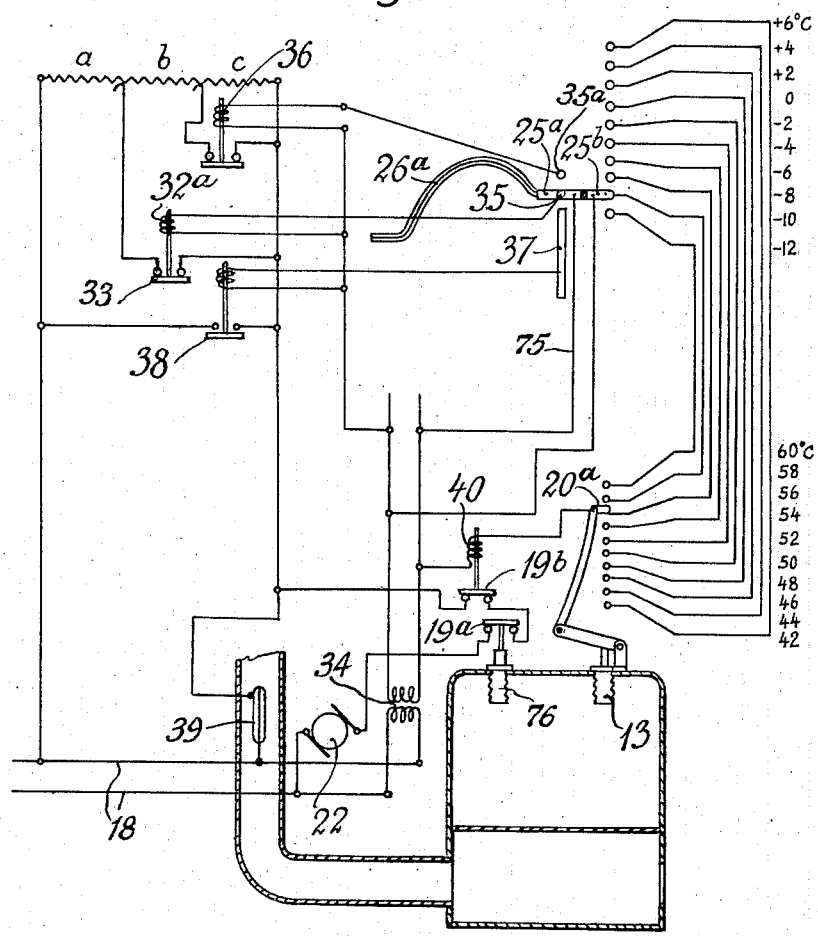

Fig. 3 shows an embodiment of the invention, with which satisfactory results have been obtained. The plant controls the maximum boiler temperatures in relation to the outside temperature according to the following table:

| Outside temperature | Boiler temperature |
|---|---|
| °C. | °C. |
| +6 | 42 |
| +4 | 44 |
| +2 | 46 |
| 0 | 48 |
| −2 | 50 |
| −4 | 52 |
| −6 | 54 |
| −8 | 56 |
| −10 | 58 |
| −12 | 60 |

This embodiment includes a bimetallic thermostat 26a arranged outside the building. The thermostat 26a is provided with conducting portions 25a and 25b separated by insulating material to provide two contact members.

When the outside temperature is for example −10° C. the relay coil 32a will be energized and the switch 33 is thus closed. The circuit to this relay extends from one terminal of the secondary winding of the transformer 34 through the coil 32a to the contact 35 engaged by the contact member 25a from which a conductor 75 completes the circuit to the other terminal of the transformer winding 34.

Thus the resistance a therefor will be inserted in the motor circuit and consequently, the size of the flame will be somewhat reduced. In case the outside temperature is −8, the contact-piece 25a engages the contact 35a, and the relay 36 will be energized and the resistance a+b is inserted in the motor circuit. At higher outdoor temperatures the entire resistance a+b+c will be inserted in the motor circuit, and the flame will be reduced to the smallest size. At the temperature of −12° C. and below the contact-piece 25a engages the contact-bar 37, and the relay 38 is energized and the resistance of the motor circuit is short circuited.

When putting the plant into operation, the motor 22 starts without inserted resistance, and the flame will be complete, as the motor current flows through the switch 39 (thermostat) in the flue. This thermostat 39 is closed when the chimney is cold, but when the chimney becomes hot, the thermostat 39 is opened and the motor current will flow through the resistance corresponding to the outside temperature. The boiler temperature increases, whereby the contact-piece 20a moves upwards over the contacts corresponding to the different boiler temperatures. If the resistor a is correctly adjusted the contact piece 20a will stop immediately below the contact corresponding to a boiler temperature of 58° C. However, if the contact piece 20a engages the contact corresponding to 58° C. the relay 40 will be energized whereby the switch 19b is actuated and opens the motor circuit so that the flame is extinguished.

The control system shown in Fig. 3 includes a switch 19a arranged in series circuit relation with respect to the switch 19b. The switch 19a is actuated by means of a thermostat 76 associated with the boiler. The thermostat 76 is of a well known type and designed to open the switch 19a when the boiler temperature reaches 65° C. The switch 19a thus serves to open the motor circuit when the boiler temperature exceeds a predetermined value and provides emergency control means for extinguishing the flame in the event that the relay 40 fails to function. The thermostat 76 is adjusted to permit closure of the switch 19a at 38° C. so the motor circuit will be in condition to be completed. The switch 19a will normally remain closed between 38 and 65 degrees C. so as to be ineffective during the normal control range between 42 and 60 degrees C.

After the plant has been shut down the temperature of the flue will be reduced and the switch 39 will thus close. The contact piece 20a will also move downwardly upon a reduction of the temperature of the boiler. The relay coil 40 will thus be de-energized and the switch 19b will then close the motor circuit. The motor will however start at full line voltage since the thermostat 39 short circuits the resistors a, b and c. The motor being operated at full speed will provide a complete flame to heat the boiler and the temperature of the flue will rise. Then the switch 39 opens and resistors will be included in the motor circuit to control the speed of the motor and the size of the flame in accordance with the position of the thermostat 26a or in relation to the temperature outside the building.

While the invention has been described with reference to specific detailed circuit arrangements it will be appreciated that changes may be made therein. Such modifications may be made without departing from the spirit and scope of the invention as set forth in the appended claims.

I claim:

1. Apparatus for automatically controlling the heat output of an oil fired building heating plant having the oil supplied thereto by a pump and a fan driven by a motor comprising, an electrical source having one side connected to one terminal of the motor, graduated resistance means connected to the other side of the electrical source and adapted to be connected to the other motor terminal, a thermostat positioned outside the building, means for establishing circuits from the graduated resistance means to positions adjacent the thermostat, conducting means moved by the thermostat for completing the motor circuit through said resistance means in accordance with the temperature outside the building, a second circuit associated with said source, additional conducting means moved by the thermostat included in the second circuit, movable means interposed in said second circuit operably responsive to the temperature of the plant, conductors extending from positions adjacent the additional conducting means to positions adjacent said movable means, and means responsive to the completion of said second circuit through one of said conductors for opening said motor circuit.

2. Apparatus for controlling the heat output of a heating plant for a building having a flue and the fuel supplied to the boiler of the plant by a pump and a fan driven by a motor comprising in combination, an electrical supply having one side thereof connected to one terminal of the motor, at least one resistor connected to the opposite side of the supply and adapted to be included in a circuit extending to the other motor terminal, temperature responsive means arranged outside of the building, means associated with said temperature responsive means for completing the motor circuit and including said resistor therein when the outside temperature rises above a predetermined value, means responsive to a rise in temperature of the boiler for opening said motor circuit, a second circuit associated with the motor circuit adapted to shunt said resistor, and means responsive to the absence of heat in said flue for closing the second circuit whereby the motor is started at full voltage of the supply.

3. Apparatus for automatically controlling the heat output of an oil fired building heating boiler having the oil supplied thereto by a pump and a fan driven by a motor comprising, an electrical source having one side connected to one terminal of the motor, graduated resistance means connected to the other side of the electrical source and adapted to be connected to the other motor terminal, a thermostat positioned outside the building, means for establishing circuits from the graduated resistance means to positions adjacent the thermostat, conducting means moved by the thermostat for completing the motor circuit through said resistance means in accordance with the temperature outside the building, means associated with said thermostat for completing the motor circuit without including the resistance means when the temperature outside the building falls below a predetermined value, means operably responsive to a predetermined high temperature of the boiler for opening said motor circuit, and means for rendering said last mentioned means operable at a temperature lower than said predetermined high boiler temperature when the temperature outside the building rises above a predetermined value.

4. Apparatus for automatically controlling the heat output of an oil fired heating plant for a building having the oil supplied thereto by a pump and a fan driven by a motor comprising, an electrical source having one side connected to one terminal of the motor, resistance means connected to the other side of said source adapted to be included in a circuit extending to the other motor terminal, a thermostat arranged outside the building, means including conducting means moved by the thermostat for completing the motor circuit through said resistance means in accordance with the temperature outside the building, a second circuit associated with said source, additional conducting means moved by the thermostat included in the second circuit, movable means associated with said second circuit operably responsive to the temperature of the plant, conductors extending from positions adjacent the additional conducting means to positions adjacent the movable means, and means responsive to the completion of said second circuit through one of said conductors for opening said motor circuit.

5. Apparatus for automatically controlling the heat output of an oil fired heating plant for a building having the oil supplied thereto by a pump and a fan driven by a motor comprising, an electrical source having one side connected to one terminal of the motor, resistance means connected to the opposite side of said source adapted to be included in a circuit extending to the other motor terminal, a thermostat arranged outside the building, means including conducting means moved by the thermostat for completing the motor circuit through said resistance means in accordance with the temperature outside the building, a second circuit associated with said source, additional conducting means moved by the thermostat included in the second circuit, movable means associated with said second circuit operably responsive to the temperature of the plant, conductors extending from positions adjacent the additional conducting means to positions adjacent the movable means, means responsive to the completion of said second circuit through one of said conductors for opening said motor circuit, an auxiliary motor circuit for shunting said resistance means, and means in said auxiliary motor circuit responsive to a predetermined low temperature of the plant for closing the auxiliary motor circuit.

6. Apparatus for automatically controlling the heat output of an oil fired heating plant for a building having the oil supplied thereto by a pump and a fan driven by a motor comprising, an electrical source having one side connected to one terminal of the motor, a resistor connected to the opposite side of said source adapted to be included in a circuit extending to the other motor terminal, a thermostat arranged outside the building, a switch controlled by the thermostat for completing the motor circuit through said resistor when the temperature outside the building rises above a predetermined value, a second circuit associated with said source, conducting means moved by the thermostat included in the second circuit, movable means in said second circuit operably responsive to the temperature of the plant, conductors extending from positions adjacent the conducting means to positions adjacent the movable means, and a switch operable upon the completion of said second circuit through one of said conductors for opening said motor circuit.

7. Apparatus for automatically controlling the heat output of an oil fired heating plant for a building having the oil supplied thereto by a pump and a fan driven by a motor comprising, an electrical source having one side connected to one terminal of the motor, a resistor connected to the opposite side of said source adapted to be included in a circuit extending to the other motor terminal, a thermostat arranged outside the building, means controlled by the thermostat for completing the motor circuit through said resistor when the temperature outside the building rises above a predetermined value, a second circuit associated with said source, conducting means moved by the thermostat included in the second circuit, movable means in said second circuit operably responsive to the temperature of the plant, conductors extending from positions adjacent the conducting means to positions adjacent the movable means, means responsive to the completion of said second circuit through one of said conductors for opening said motor circuit, and auxiliary means responsive to a predetermined high temperature of the plant for opening said motor circuit.

8. Apparatus for automatically controlling the heat output of an oil fired heating plant for a building having the oil supplied thereto by a pump and a fan driven by a motor comprising, an electrical source having one side connected to one terminal of the motor, a resistor connected to the opposite side of said source adapted to be included in a circuit extending to the other motor terminal, a thermostat arranged outside the building, conducting means moved by the thermostat for completing the motor circuit through said resistor when the temperature outside the building rises above a predetermined value, a second circuit associated with said source, additional conducting means moved by the thermostat included in the second circuit, movable means in said second circuit operably responsive to the temperature of the plant, conductors extending from positions adjacent the additional conducting means to positions adjacent the movable means, a second thermostat, a switch operated by the second thermostat for opening said motor circuit, an electrical heater in said second circuit adjacent said second thermostat whereby the heater is energized upon the completion of the second circuit.

9. Apparatus for automatically controlling the heat output of an oil fired heating plant for a building having the oil supplied thereto by a pump and a fan driven by a motor comprising, an electrical source having one side connected to one terminal of the motor, a resistor connected to the opposite side of said source adapted to be included in a circuit extending to the other motor terminal, a thermostat arranged outside the building, conducting means moved by the thermostat for completing the motor circuit through said resistor when the temperature outside the building rises above a predetermined value, a second circuit associated with said source, additional conducting means moved by the thermostat included in the second circuit, movable means in said second circuit operably responsive to the temperature of the plant, conductors extending from positions adjacent the additional conducting means to positions adjacent the movable means, thermal responsive means responsive to a predetermined high temperature of the plant for opening the motor circuit, and an electric heater energized upon the completion of the second circuit to supply heat to said thermal responsive means whereby the motor circuit is opened at a temperature lower than said predetermined high plant temperature.

10. Apparatus for automatically controlling the heat output of an oil fired heating plant for a building having the oil supplied thereto by a pump and a fan driven by a motor comprising, an electrical source having one side connected to one terminal of the motor, a resistor connected to the opposite side of said source adapted to be included in a circuit extending to the other motor terminal, a thermostat arranged outside the building, means controlled by the thermostat for completing the motor circuit through said resistor when the temperature outside the building rises above a predetermined value, a second circuit associated with said source, conducting means moved by the thermostat included in the second circuit, movable means in said second circuit operably responsive to the temperature of the plant, conductors extending from positions adjacent the conducting means to positions adjacent the movable means, means responsive to the completion of said second circuit through one of said conductors for opening said motor circuit, a flue for said plant, an auxiliary motor circuit adapted to shunt said resistor, and means responsive to the absence of heat in said flue for closing the auxiliary motor circuit.

PETTER HARTMANN-RIIS.